United States Patent Office 3,719,315
Patented Mar. 6, 1973

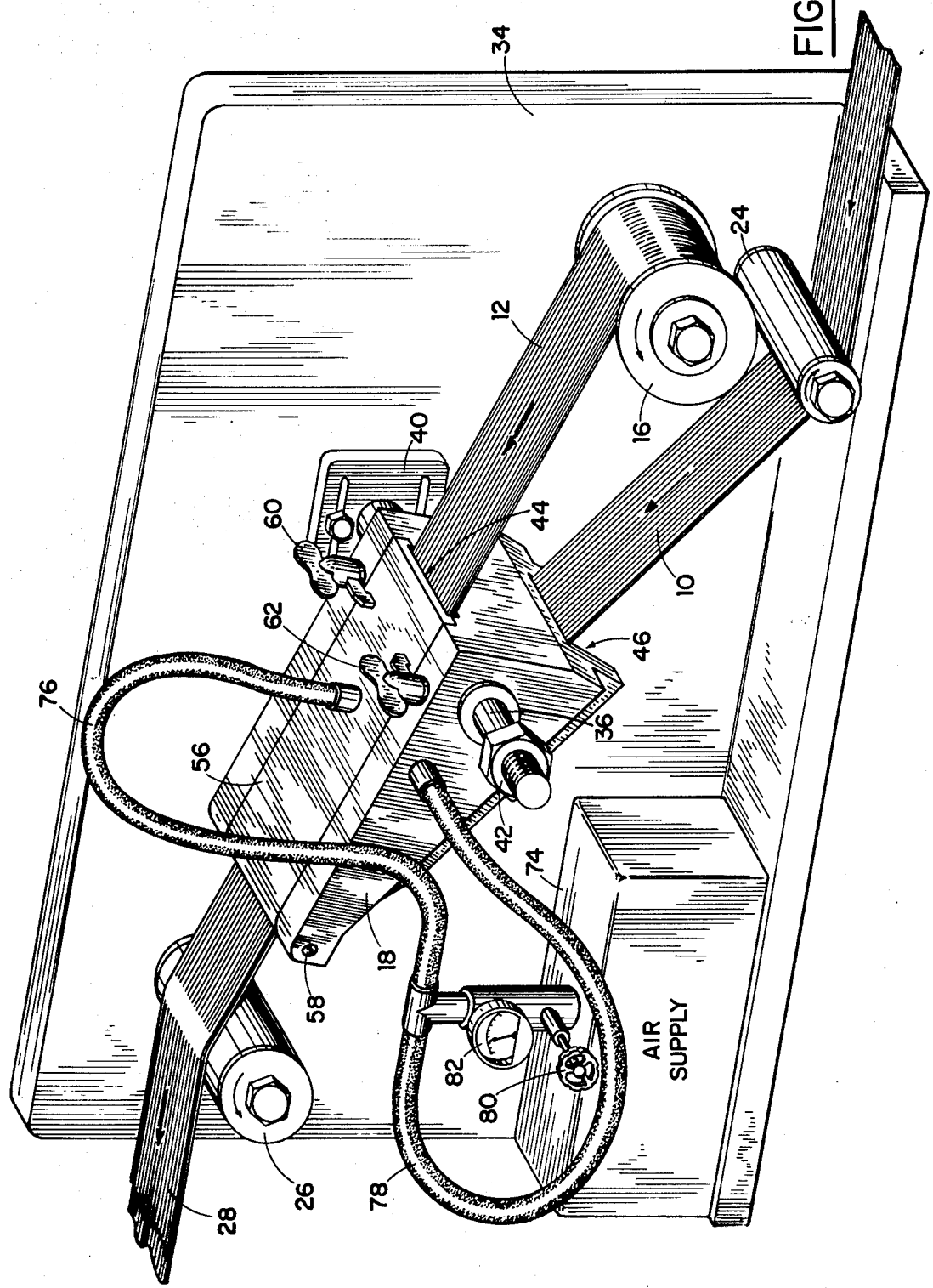

3,719,315
TAPE ALIGNING DEVICE
Bretislav Paul Zuber, Montreal, Quebec, Canada, assignor to Northern Electric Company Limited, Montreal, Quebec, Canada
Filed Apr. 10, 1972, Ser. No. 242,646
Int. Cl. B65h 23/26
U.S. Cl. 226—19          7 Claims

ABSTRACT OF THE DISCLOSURE

An apparatus is disclosed for guiding and aligning a plurality of tapes during a continuous laminating process. One of the tapes is a structurally weak heat-sensitive plastic film and the other is a heated metal tape. The plastic film is guided through a first path and the metal tape through a second path, the second path being pre-aligned with and converging towards the first path. Means are provided to support the plastic film on a frictionless air cushion and means are provided to allow the apparatus limited lateral movement to maintain both tapes perfectly aligned one above the other.

---

This invention relates to the production of metallic laminated tapes and more particularly to an apparatus for guiding and aligning a structurally weak plastic adhesive film with a stronger heated metal tape during the production of the laminate.

Metal laminated tapes are usually formed by coating one of the metal tapes on one side with a thermoplastic material and then combining the coated tape with a second heated metal tape, generally by passing them between pressure rollers.

A conventional method of coating a metal tape consists of extruding a thin film of adhesive plastic material directly onto the surface of the metal tape. Several difficulties are encountered with such a process and amongst these include the problem of extruding the plastic material with a consistent thickness throughout the entire surface of the metal tape. It is also very difficult to ensure that the entire width of the tape is coated or that the plastic material does not overlap the edges of the metal tape. In general, it is usually necessary to trim the edges of a metal tape coated in this manner prior to its being used in subsequent laminating processes.

An improved method consists of superimposing a heat sensitive adhesive plastic film directly over a heated metal tape such that the plastic film melts and becomes fused to the metal. While such a method has numerous advantages over prior art methods, there are nonetheless several problems associated therewith.

A significant problem is the difficulty of aligning the edges of the plastic film with the edges of the metal tape. This is due to the difficulty of handling the plastic film because of its inherent weakness and extreme heat sensitivity. Although it is usual in such a process to use conventional handling and guiding systems, such as guide rolls, this process does not lend itself to the use of such handling systems. For instance, because the tape is sensitive to heat, heat generated by friction caused by passing the film over rolls, or heat dispersed by the hot metal tape in the environment of the film, causes the plastic film to become very tacky. In this state, the film tends to stick to any surface upon which it comes into contact. This results in guiding rolls being gummed up with plastic material which may cause eventual breakage of the film.

Because the film is flimsy it has a tendency to become wrinkled as it is being advanced toward the metal tape. Such wrinkles, if not removed, could cause a non-uniform layer of plastic coating on the metal tape after it is bonded thereto, or it may create adhesive-free areas between the plastic and the metal. The usual method of removing such wrinkles is to pass such a film over a crown roller which stretches out the wrinkles. A heat sensitive adhesive film of the type used in the manufacture of laminated tapes is very weak and any tendency to stretch it could cause it to break and thus stop the entire laminating process.

In the manufacture of coaxial cable of the type disclosed in U.S. Pat. No. 3,634,606, issued Jan. 11, 1972 entitled "Outer Conductor for Coaxial Cable" by R. Iyengar, it has been found advantageous to manufacture the laminated tape to an exacting width in tandem with the cable making process. Because the laminated tape used in the manufacture of such a cable is very narrow, in the order of 1¼" wide, the plastic adhesive film used to coat one of the metal tapes is extremely weak and cannot, therefore, be handled by conventional handling and guiding systems such as guide rolls, etc. without having breakage problems. It is essential, therefore, that the laminating process be completely trouble free in order to avoid stoppage of the cable making process.

In accordance with the present invention, improved means are provided for guiding and aligning a structurally weak heat sensitive film with a heated metal tape during a continuous laminating process.

The invention is particularly directed to an apparatus for guiding a structurally weak plastic film, without the use of guide rolls, and for aligning said weak film with a heated metal tape during a continuous laminating process. Means are provided to permit limited lateral movement of the apparatus to maintain both the plastic film and the metal tape in a predetermined alignment, one above the other.

An example embodiment of the invention is shown in the accompanying drawings in which:

FIG. 4 is a perspective view of an apparatus for guiding and aligning two tapes in accordance with the present invention.

Figure 1:
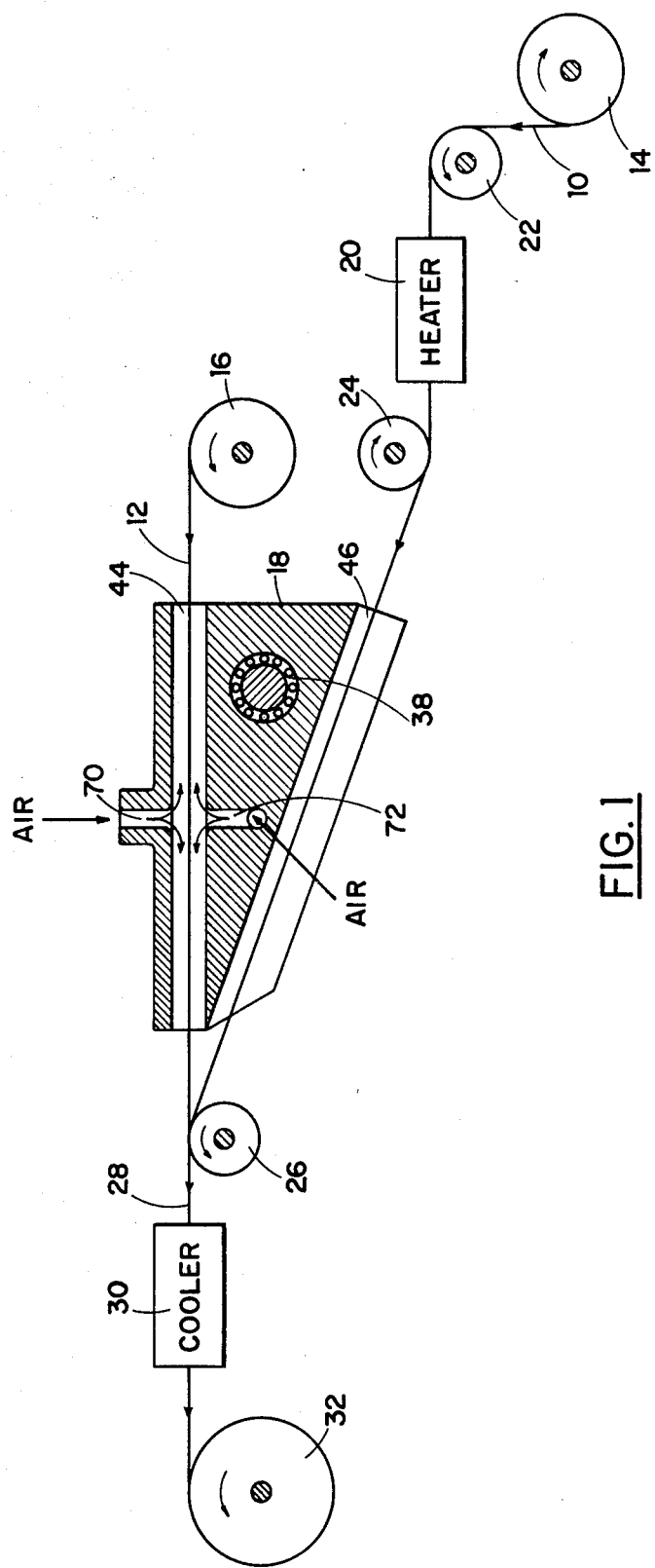
FIG. 1 is a schematic diagram showing the steps of coating a metal tape with a plastic film employing the apparatus of the present invention.

As seen in FIG. 1, of the drawings, the example embodiment of the invention shows a metal tape 10 and a heat sensitive plastic film 12 each fed from separate supply spools 14 and 16, respectively, being advanced through a guide member, indicated generally as 18. The metal tape 10 is fed through a heater 20 located between guide rolls 22 and 24, respectively, which heats the tape to a temperature sufficient to cause plastic film 12 to melt or become tacky upon contact therewith when both tape and film converge at guide roll 26 at which point they become bonded. The resulting coated metal tape or laminate, as indicated at 28 is then cooled to at least room temperature by cooler 30 and then wound onto a suitable spool 32. If preferred, the laminate 28 may be advanced to a further manufacturing station (not shown) where a second metal tape (not shown) may be similarly bonded thereto. Guide rolls 22, 24 and 26 are idler rolls which are driven by the movement of the metal tape 10 and laminate 28 respectively. Tapes 10 and 12 are advanced at a uniform rate by means of driven take up spool 32. Both give-ups 14 and 16 are free rolling spools being mounted on frictionless bearings.

Figure 3:
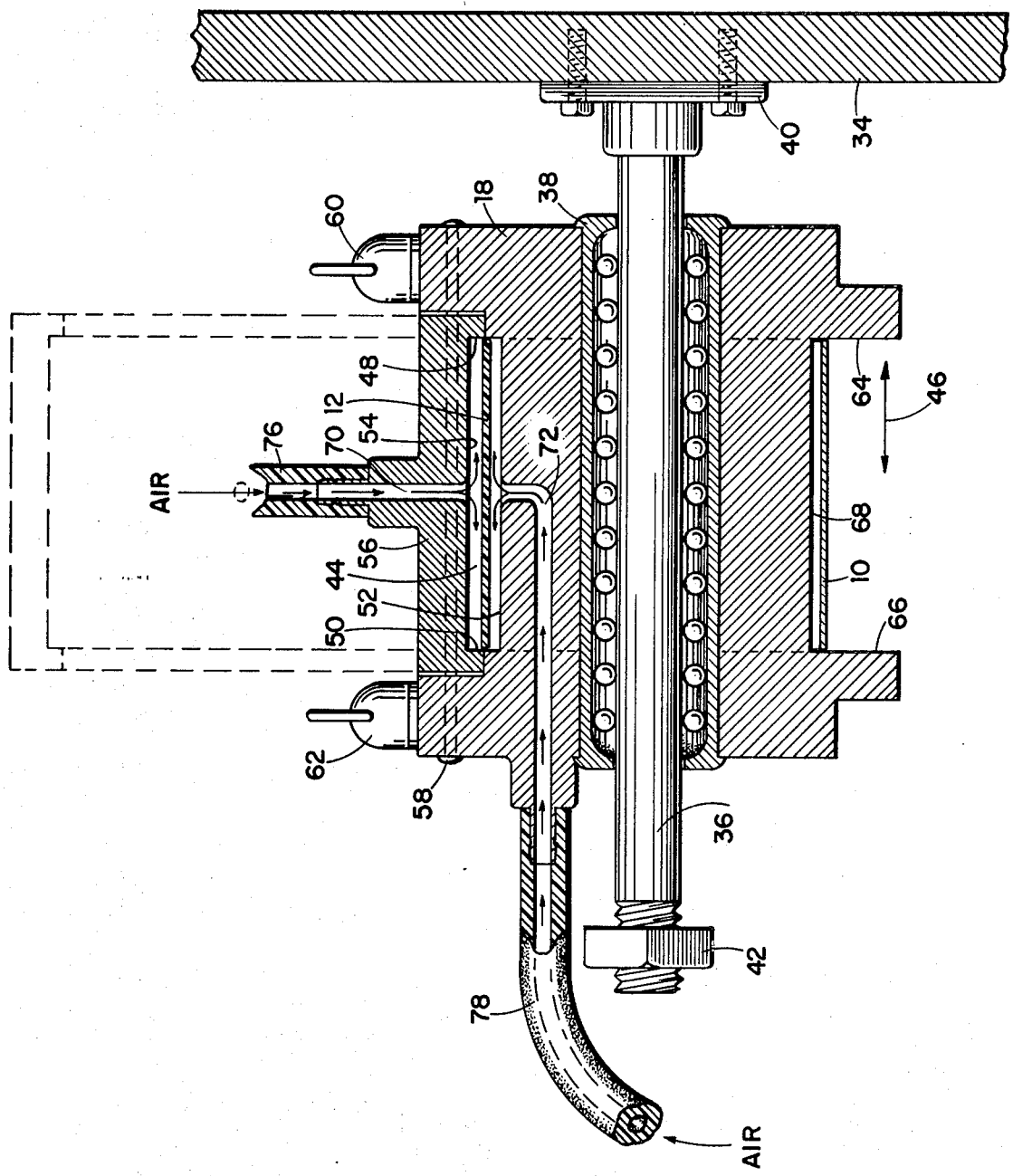
FIG. 3 is an enlarged sectional view taken along line 3—3 of FIG. 2.

Referring now to FIG. 4, guide member 18 is slidably mounted to a support frame 34 by means of a shaft 36 extending through a bushing 38 rigidly mounted in guide member 18 (see FIG. 3). Shaft 36 is secured at one end to a flange 40 adjustably mounted to support frame 34 and extends a length slightly greater than the width of guide member 18 to permit limited lateral movement of the latter with respect to the direction of the advancing tapes. A nut 42 secured to shaft 36 prevents excess lateral movement of guide member 18.

An essential feature of the invention is the provision for lateral movement of guide member 18. The invention is directed to guiding and aligning two advancing tapes, one of which is usually structurally weaker than the other. In the present instance, for example, the apparatus of the invention is used to guide and align a flimsy plastic film directly over a more rigid metal tape with edge to edge precision. In general, metal tapes usually have a tendency to advance in a wavy fashion in the horizontal plane when paid off from a coil. The flimsy plastic tape, on the other hand, does not have sufficient rigidity to allow it to advance in such a wavy fashion. Consequently conventional handling means would make it very difficult to ensure that both tapes were precisely aligned one above the other through the entire manufacturing length. Furthermore, if the apparatus of the present invention were mounted in a rigid fashion, that is to say, if no lateral movement of the apparatus was possible, a metal tape advancing in a wavy fashion would be subject to wear and damage along its edges due to the edges alternately rubbing against the side walls 64 or 66 of passageway 46 of the guide member.

In the present instance, because guide member 18 is permitted limited lateral movement, any tendency for the metal tape to wander laterally causes guide member 18 to follow its path. Consequently, since the flimsy plastic film has little or no strength, the lateral movement of guide member 18 causes the plastic tape advancing through passageway 44 to move laterally with it. Thus, No matter what lateral movement is caused by the metal tape, the plastic tape follows this same path and consequently when the two tapes converge, they are precisely aligned one above the other.

Figure 2:
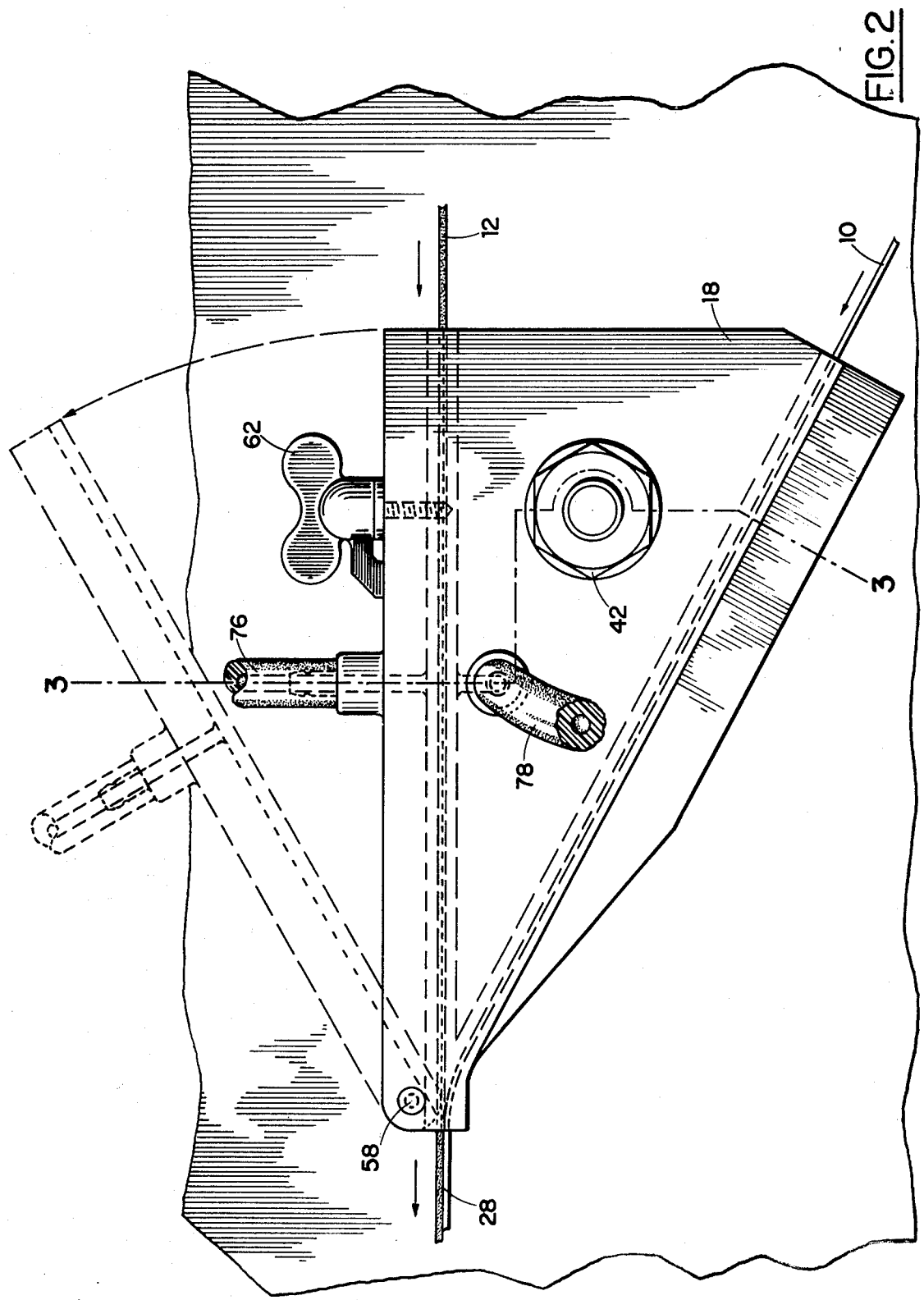
FIG. 2 is an enlarged side elevation view of the apparatus.

Guide member 18 is formed with passageways 44 and 46 which run along converging paths as seen more clearly in FIG. 2. Passageway 44 comprises an enclosed track having side walls 48 and 50 and a bottom wall 52 formed by a groove in guide member 18. The top wall 54 comprises a movable lid 56 secured at the tape outlet portion by means of a hinge 58 and at the tape inlet end by means of moveable clamps 60 and 62. Passageway 44 has a width substantially equal to the width of plastic film 12 and a depth substantially greater than the thickness of film 12 to provide a gap above and below said film. Passageway 46 comprises an open track having side walls 64 and 66 and a top wall 68 formed by a groove in guide member 18. Passageway 46 has a width substantially equal to the width of metal tape 10 and its path converges towards passageway 44 at the tape outlet end of guide member 18.

As seen more clearly in FIG. 3, passageways 44 and 46 are aligned one directly above the other for the purpose of aligning the plastic film with the metal tape both being of equal width. It is to be understood however, that tapes of dissimilar widths may be aligned as desired simply by changing the width and alignment of one of the passageways. For instance, it may be desirable to coat only a portion of a metal tape with a layer of plastic leaving an edge portion thereof bare. In such a case, passageway 44 would be narrower than passageway 46, having a width substantially equal to the width of plastic film 12 and only one of walls 48 and 50 would be aligned directly above one of walls 64 or 66. Similarly, other alignment configurations may be arrived at simply by forming passageway 44 to the width desired and aligned as desired with passageway 46.

Passageway 44 is formed with openings 70 and 72 in the top and bottom wall respectively through which compressed air may be applied. Although one opening 70 or 72 is shown in either of the top or bottom walls in the drawings, it is contemplated that several such openings extending the entire width of the passageway may exist.

Compressed air from a supply tank 74 is fed to openings 70 and 72 respectively by means of flexible pressure hoses 76 and 78. Air thus supplied through openings 70 and 72 provides an air cushion on each surface of plastic film 12 which prevents it from contacting either of the top or bottom walls of passageway 44. The film 12 thus rides in a frictionless cushion of air and is thus not subject to stretching or breaking. The pressurized air provides another feature by smoothing out the film to eliminate wrinkles that may have formed therein while being advanced from its supply spool 76. Because it is important to keep the film away from any source of heat, the air cushion also acts as a cooling medium thus ensuring that the film is not deformed nor does it become tacky until it is superimposed on the hot metal tape to which it is being bonded.

Preferably, the air pressure on each surface of the plastic film is equal, and it has been found that a pressure of one or two pounds per square inch is adequate to keep the film centered in passageway 44. This pressure is also adequate to remove any wrinkles found therein and maintain the film in a horizontal plane parallel to the metal tape. The pressure may be adjusted by means of valve 80 and a pressure reading maybe taken by means of a pressure gauge 82 connected in the supply line.

What is claimed is:

1. An apparatus for guiding and aligning two advancing tapes comprising:
   a guide member defining first and second paths;
   said first path comprising an enclosed passageway through which a flimsy tape is advanced;
   said passageway having side-walls adjacent and closely spaced to each edge of said flimsy tape, and top and bottom walls adjacent and spaced from opposite surfaces of said tape to provide gaps therebetween;
   said second path comprising an open passageway through which a rigid tape is advanced;
   said passageway having side-walls adjacent and closely spaced to each edge of said rigid tape, and a top wall adjacent to the top surfce of said rigid tape;
   said first and second paths arranged to guide the tapes in a predetermined alignment one above the other;
   said first path including means for preventing said flimsy tape from touching said top or bottom walls; and
   said guide member including support means allowing it limited movement transversely of the tape.

2. An apparatus as defined in claim 1 wherein said second passageway defines a path converging towards said first path.

3. An apparatus as defined in claim 1 wherein said means for preventing said flimsy tape from touching the top and bottom walls comprises pressurized gas fed through at least one opening in each of said top and bottom walls.

4. An apparatus as defined in claim 1 wherein said support means comprises a shaft slidably mounted in a bushing rigidly secured to said guide member.

5. An apparatus as defined in claim 1 wherein said top wall of said first path comprises a removable lid secured to one end by means of a hinge and at the other end by means of movable clamps.

6. An apparatus as defined in claim 1 wherein said first and second paths are equal in widths and are aligned one above the other such that their side walls are in vertical alignment.

7. An apparatus as defined in claim 1 wherein only one side wall of said first path is vertically aligned with one side wall of said second path.

References Cited

UNITED STATES PATENTS

| 2,735,630 | 2/1956 | Ziebolz | 226—19 X |
| 3,317,101 | 5/1967 | Himrod | 226—19 |

RICHARD A. SCHACHER, Primary Examiner

U.S. Cl. X.R.

226—97, 109